Figure 1:
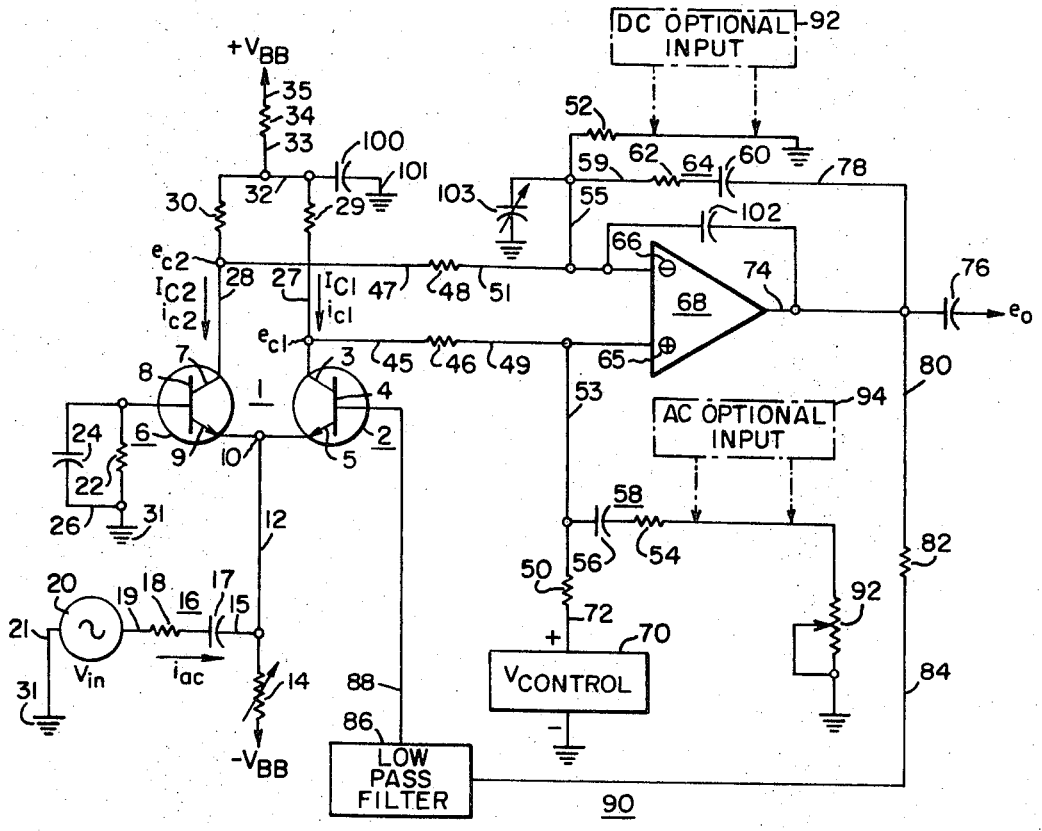
Figure 2:
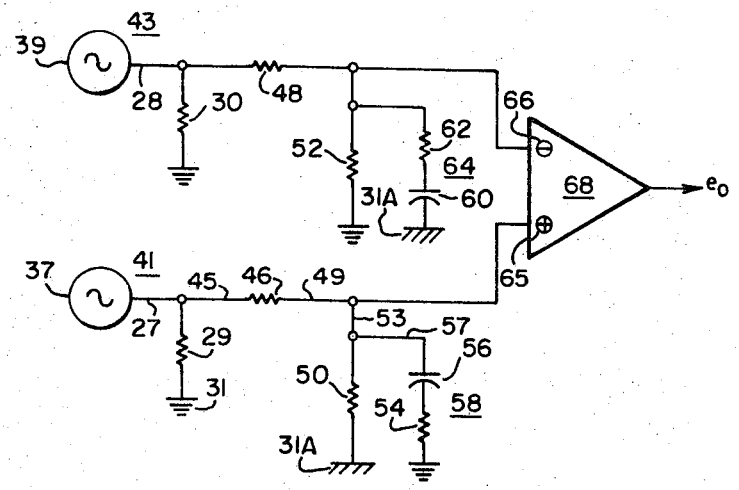
Figure 3:
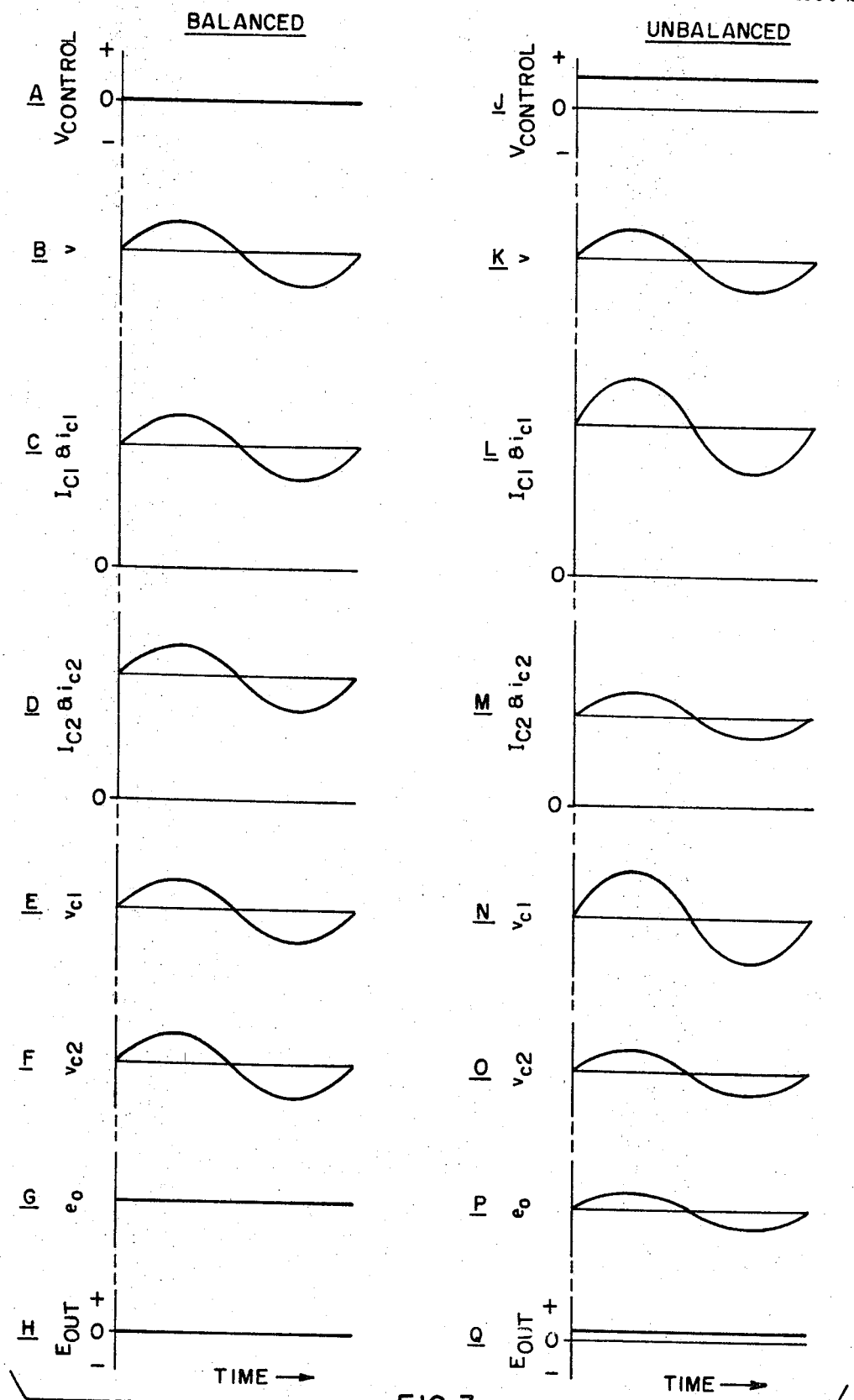

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 4, 1971

886 O.G. 5

T886,006
LINEAR FOUR-QUADRANT MULTIPLIER

Daniel R. Nichols, 302 John Ave.,
Linthicum Heights, Md. 21090

Filed Apr. 15, 1970, Ser. No. 28,679
Int. Cl. G06g *7/12*
U.S. Cl. 307—229
2 Sheets Drawing. 16 Pages Specification

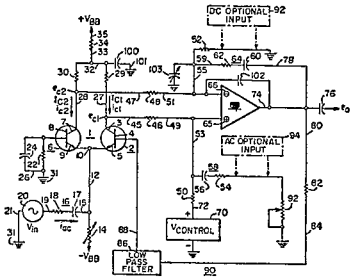

A circuit for multiplying two voltages together. The output is a voltage which is proportional to the product of the two voltages and whose sign is directly related to the signs of each of the input voltages. Even though nonlinear elements are used, such as transistors, the final output voltage varies linearly with each of the input voltages. An AC voltage (2) is an input to a high gain amplifier (1). A DC voltage (70) is an input to a high gain operational amplifier (68). The two amplifiers are interconnected by a DC bridge and an AC bridge. Initially, both bridges are balanced. A change in the DC voltage momentarily unbalances the output of the DC bridge. The high gain of the operational amplifier (68) provides a degenerative feedback voltage to control the multiplying amplifier (1) by rebalancing the DC bridge so that the overall output is a linear multiplication.

LINEAR FOUR-QUADRANT MULTIPLIER

Filed April 15, 1970 2 Sheets-Sheet 1

WITNESSES:

Bernard R. Giegner

James T. Young

INVENTOR
Daniel R. Nichols

BY Stanley Weinberg
ATTORNEY

LINEAR FOUR-QUADRANT MULTIPLIER

Filed April 15, 1970 2 Sheets-Sheet 2